United States Patent [19]
Pawlowski

[11] Patent Number: 6,108,735
[45] Date of Patent: *Aug. 22, 2000

[54] METHOD AND APPARATUS FOR RESPONDING TO UNCLAIMED BUS TRANSACTIONS

[75] Inventor: Stephen S. Pawlowski, Beaverton, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/536,096

[22] Filed: Sep. 29, 1995

[51] Int. Cl.$^7$ ...................................................... G06F 13/00
[52] U.S. Cl. ........................... 710/107; 710/109; 710/112; 710/240; 710/118; 710/59
[58] Field of Search .................................... 395/287, 292, 395/293, 308, 309, 800, 445, 468, 473, 728, 859, 298, 300, 305, 851, 852, 853, 878

[56] References Cited

U.S. PATENT DOCUMENTS

| | | | |
|---|---|---|---|
| 4,965,716 | 10/1990 | Sweeney | 395/292 |
| 5,455,957 | 10/1995 | Pawlowski et al. | 395/800 |
| 5,481,680 | 1/1996 | Larson et al. | 395/292 |
| 5,485,586 | 1/1996 | Brash et al. | 395/292 |
| 5,524,216 | 6/1996 | Chan et al. | 395/287 |
| 5,530,933 | 6/1996 | Frink et al. | 395/468 |
| 5,535,340 | 7/1996 | Bell et al. | 395/292 |
| 5,546,546 | 8/1996 | Bell et al. | 395/292 |
| 5,568,621 | 10/1996 | Wooten | 395/292 |
| 5,581,782 | 12/1996 | Sarangdhar et al. | 395/800 |
| 5,594,875 | 1/1997 | Thaller | 395/287 |
| 5,615,343 | 3/1997 | Sarangdhar et al. | 395/292 |
| 5,619,687 | 4/1997 | Langan et al. | 395/557 |
| 5,621,900 | 4/1997 | Lane et al. | 395/300 |
| 5,623,645 | 4/1997 | Yip et al. | 395/551 |
| 5,625,778 | 4/1997 | Childers et al. | 395/287 |
| 5,682,551 | 10/1997 | Pawlowski et al. | 395/856 |
| 5,740,376 | 4/1998 | Carson et al. | 395/281 |

OTHER PUBLICATIONS

"PCI Local Bus Specification Revision 2.0," Cover and title pages, Table of Contents and pp. 24–25., Apr. 30, 1993.

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

Primary Examiner—Ayaz R. Sheikh
Assistant Examiner—Raymond N Phan
Attorney, Agent, or Firm—Blakely, Sokoloff, Taylor & Zafman, LLP

[57] ABSTRACT

An agent retrieves a request, which is part of a bus transaction, from a bus. The agent then stores an identifier of the bus transaction and responds to the bus transaction after a predetermined period of time, provided the agent was not the target of the request and the target agent did not respond. In one embodiment, the agent includes a queue and a timer. A controller within the agent starts the timer if the agent is not the target of the request, a snoop phase has occurred for the request, and the request is at the top of the queue. If the timer expires without the request having received a response, then the agent responds to the request.

12 Claims, 6 Drawing Sheets

METHOD AND APPARATUS FOR RESPONDING TO UNCLAIMED BUS TRANSACTIONS

BACKGROUND OF THE INVENTION

1. Field of the Invention

The present invention pertains to computer systems and computer system buses. More particularly, this invention relates to responding to requests placed on a computer system bus.

2. Background

Computer technology is continuously advancing, resulting in modern computer systems which provide ever-increasing performance. One result of this improved performance is an increased use of personal computer systems by individuals in a wide variety of business, academic and personal applications.

Personal computer systems typically have multiple resources coupled together via a system bus. These resources may include, for example, processors, memory devices, and mass storage devices. In order for the computer system to operate properly, these resources must be able to effectively communicate via the bus.

One protocol for communicating between resources used in many personal computer systems is referred to as a "normally ready" bus. On a normally ready bus, a request placed on the bus will be completed within a predefined period of time after issuance of the request. Any response information, including any data, are returned to the requesting agent within that predefined period of time. Thus, if a request which targets a nonexistent or otherwise inaccessible resource is issued on a normally ready bus, the requesting agent knows that if it does not receive the expected response within the predefined period of time, the resource is not usable.

One method used by many computer systems to determine if a device resides at a particular address in memory and/or I/O address space is referred to as "polling". When polling, an agent such as a processor writes a known value to the particular address and then attempts to read from that same address. If the data which is read matches the data which was written, then the agent assumes the device is present and usable. However, if the data read does not match the data written, then the device is either nonexistent or is working improperly. By performing these polling operations for devices which the agent believes exist at particular address locations, the agent can determine whether the devices are working properly and thus are accessible to the agent.

Performing these polling operations in a bus which is not normally ready, however, presents additional problems. That is, if agents coupled to the bus do not presume that a request placed on the bus will be completed within a predetermined time, then the agents may hang indefinitely waiting for a response which will never come (due to the target being nonexistent). Thus, it would be advantageous to provide a mechanism to issue a response which indicates to agents that a device is non-existent in a bus which is not normally ready.

Additionally, one method of increasing computer system performance is to provide a pipelined bus. In a pipelined bus, bus transactions are separated into multiple stages or phases. A transaction is completed when it has gone through all, or in some instances fewer than all, of the stages of the bus. By pipelining the bus, multiple transactions can be in progress on the bus at any given time, with each transaction being in a different stage. Thus, it would be advantageous to provide a computer system which is capable of responding to transactions which target a nonexistent or nonfunctioning device within a pipelined bus environment.

The present invention provides for these and other advantageous results.

SUMMARY OF THE INVENTION

A method and apparatus for responding to unclaimed bus transactions is described herein. An agent retrieves a request, which is part of a bus transaction, from a bus. The agent then stores an identifier of the bus transaction and responds to the bus transaction after a predetermined period of time, provided the agent was not the target of the request.

In one embodiment, the agent includes a queue and a timer. A controller within the agent starts the timer if the agent is not the target of the request, a snoop phase has occurred for the request, and the request is at the top of the queue. If the timer expires without the request having received a response, then the agent responds to the request.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Figure 1:
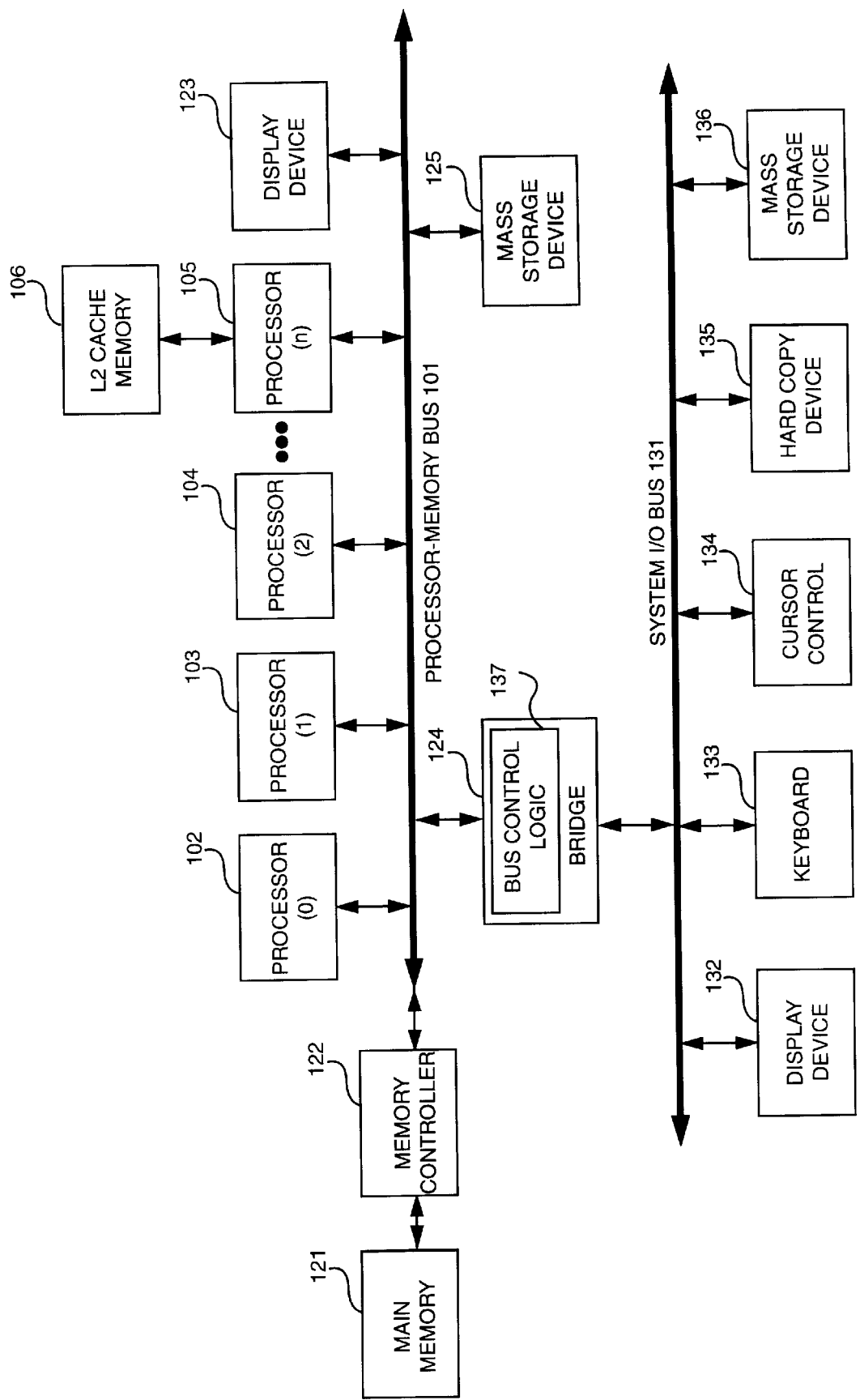
FIG. 1 shows an overview of an example multiprocessor computer system according to one embodiment of the present invention.

FIG. 1 shows an overview of an example multiprocessor computer system of the present invention. The computer system generally comprises a processor-memory bus or other communication means 101 for communicating information between one or more processors 102, 103, 104 and 105. The processor-memory bus 101 includes arbitration, address, data and control buses (not shown). In one embodiment, the processors 102 through 105 each includes a small, extremely fast internal cache memory (not shown), commonly referred to as a level one (L1) cache memory for temporarily storing data and instructions on-chip. In addition, a bigger, slower level two (L2) cache memory 106 can be coupled to any one of the processors, such as processor 105, for temporarily storing data and instructions for use by the processor(s). Each processor may have its own, optional L2 cache, or some may share an L2 cache.

Processors 102, 103, and 104 may each be a parallel processor (a symmetric co-processor), such as a processor similar to or the same as processor 105. Alternatively, processor 102, 103, or 104 may be an asymmetric co-processor, such as a digital signal processor. In addition, processors 102 through 105 may include processors of different types. In one embodiment, the present invention includes Intel® Architecture microprocessors as processors 102 through 105, such as i386™, i486™, or Pentium® processors. However, the present invention may utilize any type of microprocessor architecture. It is to be appreciated that the particular architecture(s) used are not especially germane to the present invention.

The processor-memory bus 101 provides system access to the memory and input/output (I/O) subsystems. A memory controller 122 is coupled to the processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to the processor-memory bus 101.

An input/output (I/O) bridge 124 may be coupled to the processor-memory bus 101 and a system I/O bus 131 to provide a communication path or gateway for devices on either processor-memory bus 101 or I/O bus 131 to access or transfer data between devices on the other bus. Essentially, the bridge 124 is an interface between the system I/O bus 131 and the processor-memory bus 101. The bridge 124 also includes bus control logic 137 which maintains a record of all outstanding transactions on the bus 101. In one embodiment of the present invention, it is the bus control logic 137 that assumes responsibility for responding to unclaimed bus transactions, as described in more detail below.

The I/O bus 131 communicates information between peripheral devices in the computer system. Devices that may be coupled to the system bus 131 include, for example, a display device 132, such as a cathode ray tube, liquid crystal display, etc., an alphanumeric input device 133 including alphanumeric and other keys, etc., for communicating information and command selections to other devices in the computer system (e.g., the processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to the system bus 131.

In one embodiment of the present invention, each of the agents coupled to the processor-memory bus 101 contains bus control circuitry which maintains a record of all outstanding transactions on the bus. However, only one of the agents coupled to the bus assumes responsibility for responding to unclaimed transactions.

In certain implementations of the present invention, additional processors or other components may be included. Additionally, in certain implementations components may be re-arranged. For example, the L2 cache memory 106 may lie between the processor 105 and the processor-memory bus 101. Furthermore, certain implementations of the present invention may not require nor include all of the above components. For example, the processors 102 through 104, the display device 123, or the mass storage device 125 may not be coupled to the processor-memory bus 101. Additionally, the peripheral devices shown coupled to the system I/O bus 131 may be coupled to the processor-memory bus 101; in addition, in some implementations only a single bus may exist with the processors 102 through 105, the memory controller 122, and the peripheral devices 132 through 136 coupled to the single bus.

In one embodiment of the present invention, a bus bridge, such as the bridge 124, contains the control logic for responding to unclaimed transactions. However, it is to be appreciated that another agent coupled to the bus, such as a processor or a memory controller, could be responsible for responding to unclaimed transactions. Alternatively, a separate dedicated device, coupled to the bus, could respond to the unclaimed transactions. In one embodiment of the present invention, multiple bus bridges may be coupled to the processor bus. In this embodiment, one of the bridges is identified at system startup (e.g., by a jumper configuration, arbitration, or other suitable means) as the "compatibility bridge". In one implementation, the compatibility bridge responds to unclaimed transactions.

Figure 2:
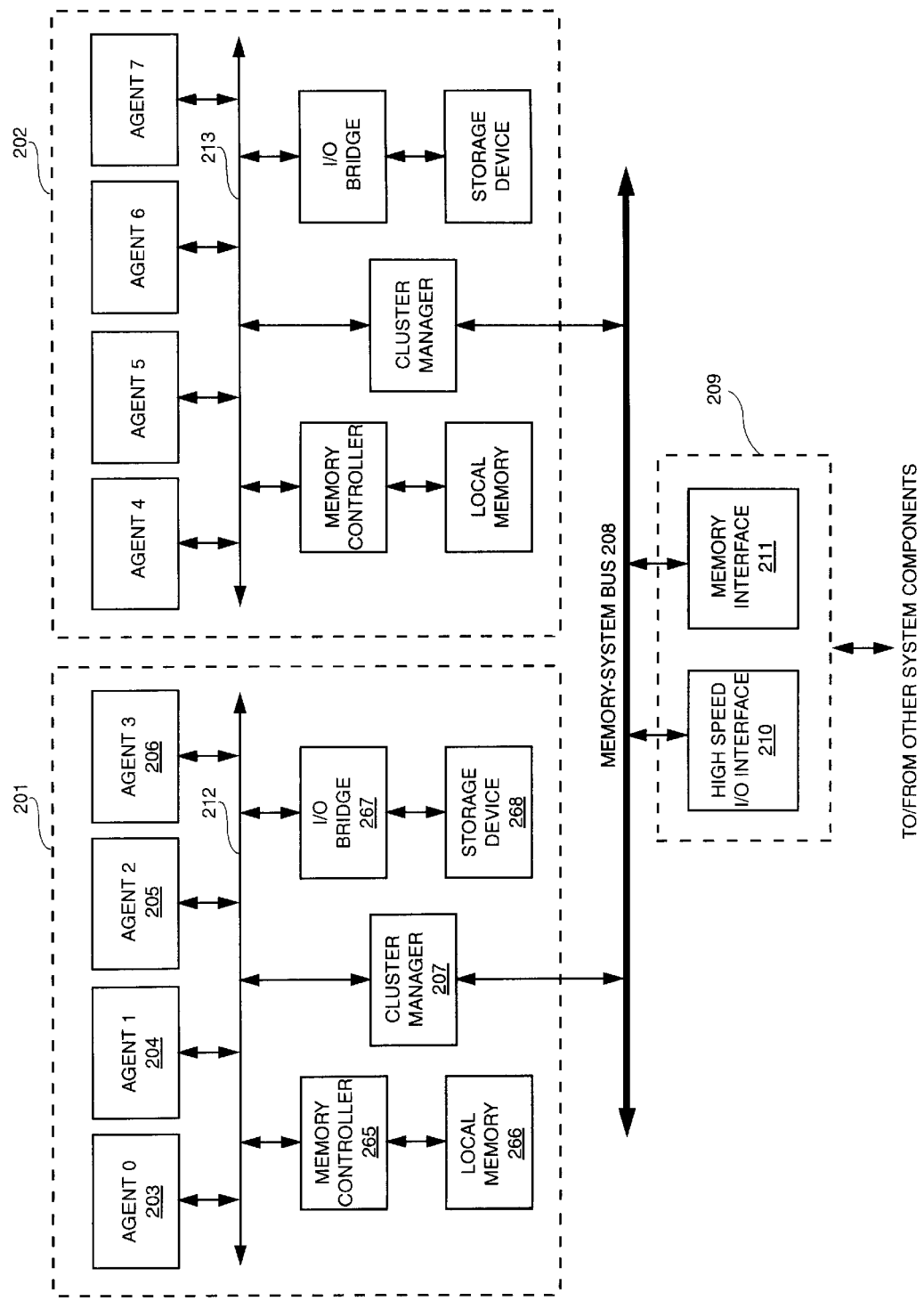
FIG. 2 is a block diagram showing an exemplary bus cluster system such as may be used in an alternatively configured system which uses the present invention.

FIG. 2 is a block diagram showing an exemplary bus cluster system such as may be used in an alternatively configured system which uses the present invention. FIG. 2 shows two clusters 201 and 202 of agents. Each of these clusters is comprised of a number of agents. For example, the cluster 201 is comprised of four agents 203–206 and a cluster manager 207, which may include another cache memory (not shown), coupled to the bus 212. The agents 203–206 can include microprocessors, co-processors, digital signal processors, etc.; for example, the agents 203 through 206 may be the same as the processor 102 shown in FIG. 1. The cluster manager 207 and its cache are shared between these four agents 203–206. Each cluster is coupled to a memory-system bus 208. These clusters 201 and 202 are coupled to various other components of the computer system through a system interface 209. The system interface 209 includes a high speed I/O interface 210 for interfacing the computer system to peripheral devices (not shown) and a memory interface 211 which provides access to a global main memory (not shown), such as a DRAM memory array. In one embodiment, the high speed I/O interface 210 is the bridge 124 of FIG. 1, and the memory interface 211 is the memory controller 122 of FIG. 1.

In one embodiment of the present invention, each cluster also includes a local memory controller and/or a local I/O bridge. For example, the cluster 201 may include a local memory controller 265 coupled to the processor bus 212. The local memory controller 265 manages accesses to a RAM or other local memory 266 contained within the cluster 201. The cluster 201 may also include a local I/O bridge 267 coupled to the processor bus 212. Local I/O bridge 267 manages accesses to I/O devices within the cluster, such as a mass storage device 268, or to an I/O bus, such as system I/O bus 131 of FIG. 1.

In one embodiment of the present invention, the buses 212 and 213 and the memory-system bus 208 operate analogous to the processor-memory bus 101 of FIG. 1.

Certain implementations of the present invention may not require nor include all of the above components. For example, the cluster 201 or 202 may comprise fewer than four agents. Alternatively, the cluster 201 or 202 may not include the memory controller, local memory, I/O bridge, and storage device. Additionally, certain implementations of the present invention may include additional processors or other components.

In one embodiment of the present invention, bus transactions occur on the processor-memory buses described above in FIGS. 1 and 2 in a pipelined manner. That is, multiple bus transactions may be pending at the same time, wherein each is not fully completed. Therefore, when a requesting agent begins a bus transaction by driving an address onto the address bus, the bus transaction may be only one of a number of bus transactions currently pending. Although bus transactions are pipelined, the bus transactions in the present invention do not have to be fully completed in order. Therefore, the present invention allows for completion replies to requests to be out-of-order.

In one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions, or in unaligned memory operations which software expects to be atomic. In this embodiment, a transaction is the set of bus activities related to a single request, from request bus arbitration through the data transfer on the data bus.

In one embodiment of the present invention, a transaction contains up to six distinct phases. However, certain phases are optional based on the transaction and response type. Alternatively, additional phases could also be added. A phase uses a particular signal group to communicate a particular type of information. In one implementation, these phases are:
Arbitration Phase
Request Phase
Error Phase
Snoop Phase
Response Phase
Data Transfer Phase In one mode, the data transfer phase is optional and is used if a transaction is transferring data. The data phase is request-initiated if the data is available at the time of initiating the request (for example, for a write transaction). The data phase is response-initiated if the data is available at the time of generating the transaction response (for example, for a read transaction). A transaction may contain both a request-initiated data transfer and a response-initiated data transfer.

Figure 3:
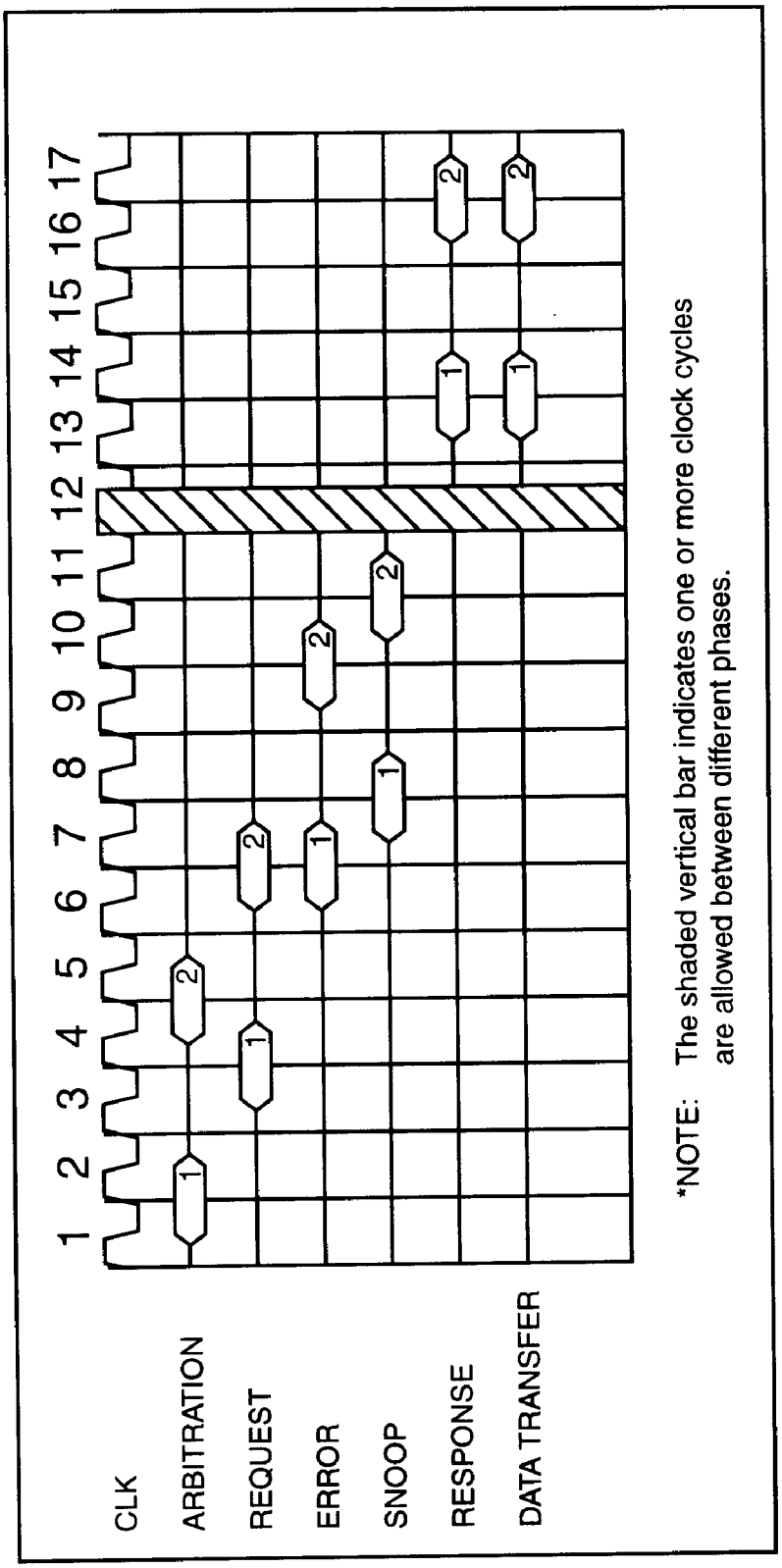
FIG. 3 shows an example of overlapped phases for two bus transactions according to one embodiment of the present invention.

Different phases from different transactions can overlap, thereby pipelining bus usage and improving bus performance. FIG. 3 shows an example of overlapped phases for two transactions. Referring to FIG. 3, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clocks after ownership is requested.

The second phase is the request phase, in which the bus owner drives a request and address information on the bus. In one implementation, the request phase is one or more clocks after bus ownership is granted (provided there is an arbitration phase), and is two clocks long. In the first clock, an address signal is driven along with the transaction address and sufficient information to begin snooping a memory access. In the second clock, the byte enables, a transaction identifier, and the requested data transfer length are driven, along with other transaction information.

The third phase of a transaction is an error phase. The error phase indicates any immediate errors, such as parity errors, triggered by the request. If an error is discovered, an error signal is asserted during the error phase by the agent which detected the error in the transaction. When an error is indicated, the transaction is immediately dropped (that is, the transaction progresses no further in the pipeline) and may be re-driven by the agent which issued the transaction. Whether the agent re-issues the transaction depends on the agent itself. In one implementation, the error phase is three clocks after the request phase.

In one embodiment, every transaction that is not canceled because of an error in the error phase has a snoop phase. The snoop phase indicates if the cache line accessed in a transaction is not valid, valid or modified (dirty) in any agent's cache. In one implementation, the snoop phase is four or more clocks from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation, the snoop window is a single bus clock.

In one implementation, snoop results are indicated during the snoop phase using hit and modified hit signals. Assertion of the hit signal with the modified hit signal inactive indicates that a request issued on the bus hits the cache of another agent coupled to the bus. Assertion of the modified hit signal with the hit signal inactive indicates that the request issued on the bus hits the cache of another agent coupled to the bus and that the data in that cache is in a modified state. Additionally, according to the protocol used in one embodiment of the present invention, concurrent assertion of both hit and modified hit signals by an agent coupled to the bus indicates to stall the snoop pipeline of the bus. A stall on the snoop pipeline means that the present snoop phase (and the snoop pipeline) is stalled for a number of clocks, after which time it resumes its previous pace (assuming another stall is not asserted). In one implementation, a stall is for two clocks.

The response phase indicates whether the transaction failed or succeeded, whether the response is immediate or deferred, whether the transaction will be retried, or whether the transaction includes data phases. If a transaction contains a response-initiated data phase, then it enters the data transfer phase along with the response phase.

If the transaction does not have a data phase, then that transaction is complete after the response phase. If the requesting agent has write data to transfer, or has requested read data, the transaction has a data phase which may extend beyond the response phase. The data phase occurs only if a transaction requires a data transfer. The data phase can be response initiated (for example, by the memory controller or another processor) or request initiated.

The present invention accommodates deferred transactions by splitting a bus transaction into two independent transactions. The first transaction involves a request for data (or completion signals) by a requesting agent and a response by the responding agent. In one embodiment the request for data comprises the sending of an address on the address bus and a first token (also referred to as a transaction identifier). The response includes the sending of the requested data (or completion signals) if the responding agent is ready to respond. In this case, the bus transaction ends.

However, if the responding agent is not ready to complete the bus transaction, then the responding agent may send a deferred reply over the bus during the response phase. Sending of a deferred reply allows other transactions to be issued and not be held up by the completion of this transaction. The requesting agent receives this deferred reply. When the responding agent is ready to complete the deferred bus transaction, the responding agent arbitrates for ownership of the bus. Once bus ownership is obtained, the responding agent sends a deferred reply transaction including a second token on the bus. The requesting agent monitors the bus and receives the second token as part of the deferred reply transaction. The requesting agent latches the second token and determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token from the responding agent does match the first token, then the data on the bus (or the completion signals) is the data originally requested by the requesting agent and the requesting agent latches the data on the data bus.

It is to be appreciated that, due to the pipelined nature of the bus, multiple transactions can be at different stages of the bus at different times. For example, one transaction can be in the snoop phase, while a second transaction is in the error phase, and yet a third transaction can be in the request phase. Thus, error signals and snoop signals can both be issued concurrently on the bus even though they correspond to different transactions.

In one embodiment of the present invention, up to eight transactions can be outstanding on the bus at any particular time and up to sixteen transactions can be waiting for a deferred response at any particular time.

In the descriptions which follow, the compatibility bridge is discussed as being the agent responsible for responding to unclaimed transactions. However, it is to be appreciated that the present invention is not limited to the compatibility bridge responding to unclaimed transactions; other agents can also be configured to respond to unclaimed transactions, as discussed above.

Figure 4:
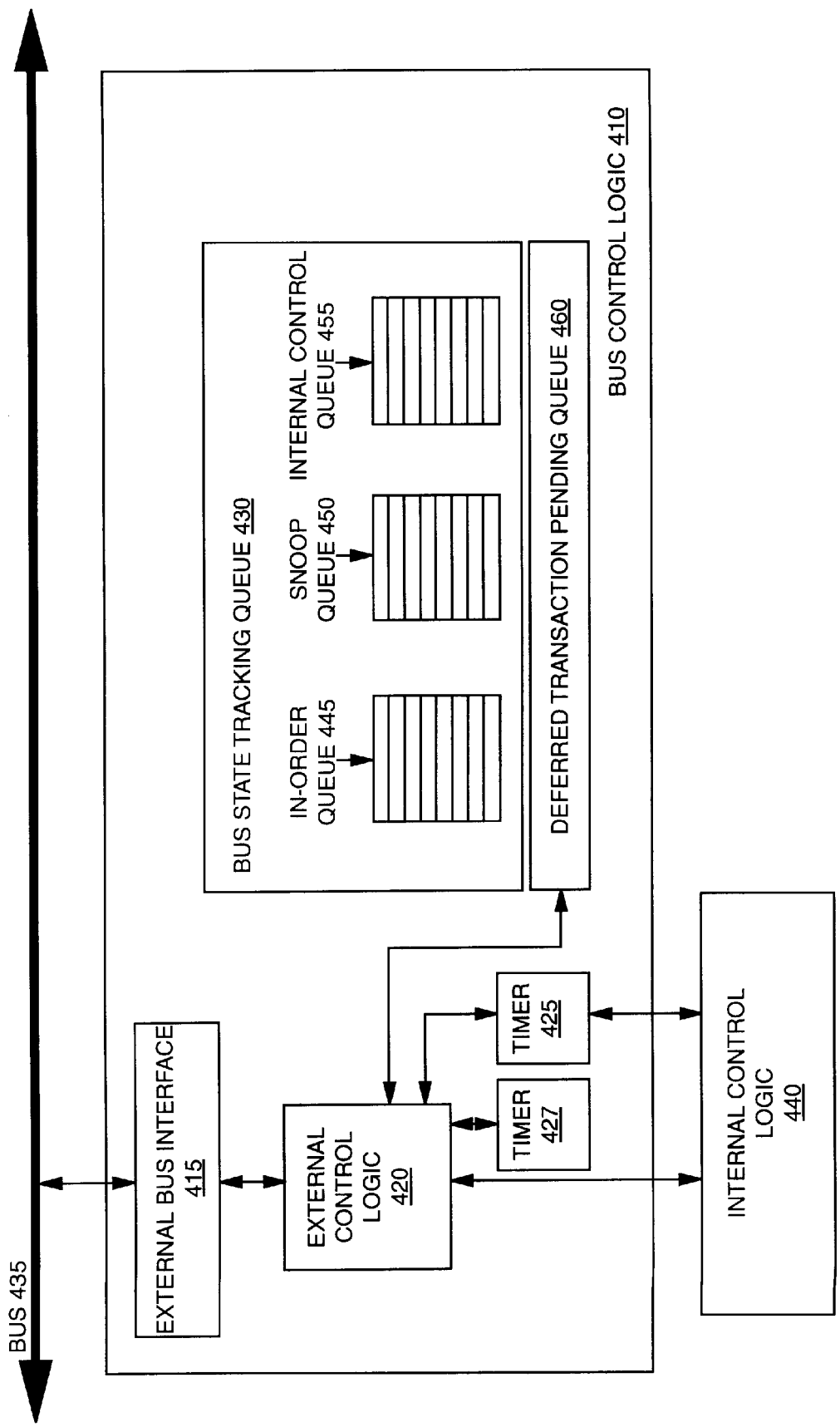
FIG. 4 illustrates bus control logic which provides an interface between the bus and the internal control logic of an agent which responds to unclaimed transactions according to one embodiment of the present invention.

FIG. 4 illustrates bus control logic which provides an interface between the bus and the internal control logic of an agent which responds to unclaimed transactions. Bus control logic 410 includes an external bus interface 415, an external control logic 420, a timer 425, and a bus state tracking queue 430.

The bus control logic 410 acts as an interface between an agent, such as a processor or bus bridge, and the external bus 435, both of which may run at different clock speeds. In one embodiment, the external bus 435 is the processor-memory bus 101 of FIG. 1.

The bus interface 415 contains the latches and necessary circuitry for interfacing between the bus control logic 410 and the bus 435.

The external control logic 420 implements the system bus protocol which allows the agent to interface with other agents via the bus 435. Thus, it is to be appreciated that different bus protocols can be used with the present invention by changing the external control logic 420. The external control logic 420 transfers requests between the bus 435 and the internal control logic 440, and also tracks the status of all outstanding requests on the bus 435 using the bus state tracking queue 430. Internal control logic 440 performs the function of the device, such as transferring requests between two buses if the device is a bridge. In one embodiment of the present invention, the external control logic 420 also carries out the steps for responding to unclaimed bus transactions as described in more detail below.

In one embodiment of the present invention, the external control logic 420 also includes error correcting and detecting logic as well as external snoop logic. The error correcting and detecting logic generates Error Correcting Code (ECC) check bits for outgoing data and parity for outgoing addresses and requests, and also checks parity on incoming address, request and response pins and ECC on incoming data pins. The external snoop logic controls all snoop requests which are received from the system bus and, for processors, snoop requests which are received from the instruction fetch unit, data cache unit, or are self-generated.

The timer 425 is also coupled to the external control logic 420. The timer 425 indicates the period of time the agent waits before responding to an unclaimed transaction. In one embodiment of the present invention, the timer 425 is a 30 ms timer. It is to be appreciated, however, that the timer 425 can have different values. It is also to be appreciated that the value of the timer 425 could also be programmable, such as by using a register, using a Flash memory device, setting configuration options (e.g., by setting jumpers), assigning a random value at reset, or by using other suitable means. Alternatively, the value of timer 425 may be dynamically adaptable, such as a different value programmed each time the timer 425 is reset (e.g., programming a random value).

In one embodiment, the external control logic 420 is coupled to an optional deferred transaction pending queue 460 of transactions waiting for deferred reply transactions from agents on the bus 435. When a request on the bus 435 receives a deferred response, the external control logic 420 places the request in the deferred transaction pending queue 460. Each time a request is issued on the bus 435, the external control logic 420 compares the transaction identifier for the request to the identifiers of the transactions (if any) stored in the deferred transaction pending queue 460. If the external control logic 420 indicates a match, then control logic 420 removes the transaction from the queue 460. It is to be appreciated that a transaction need not be at the top of the queue 460 in order to be removed from the queue 460.

In one embodiment of the present invention, a second optional timer 427 is also coupled to the external control logic 420. The timer 427 indicates the period of time the agent waits before assuming responsibility for issuing a deferred reply transaction. In one embodiment, the timer 427 tracks the oldest outstanding transaction in the deferred transaction pending queue 460 (for example, the transaction at the top of the queue 460). The timer 427 is reset each time a new transaction propagates to the top of the queue 460. In one embodiment, the timer 427 is a one second timer. It is to be appreciated that the timer 427 can have different values, be programmable or otherwise dynamically adaptable analogous to the discussion above regarding the timer 425.

The external control logic 420 is also coupled to the bus state tracking queue 430. The bus state tracking queue 430 maintains a record of the status of all transactions which are currently accessing the bus (that is, currently in the bus pipeline). The bus state tracking queue 430 includes an in-order queue 445, a snoop queue 450, and an internal control queue 455.

In one embodiment of the present invention, the bus state tracking queue 430 is a single physical queue structure which is separated logically into the in-order queue 445, the snoop queue 450, and the internal control queue 455. In this embodiment, the in-order queue 445, the snoop queue 450 and the internal control queue 455 are not physically separate queues.

The bus state tracking queue 430 includes a separate element for each transaction which is currently outstanding on the bus (that is, each transaction in the bus pipeline). In one embodiment of the present invention, the bus state tracking queue 430 can store up to eight transactions.

The in-order queue 445 maintains a transaction target address and a transaction identifier, along with other transaction information, for each transaction in the bus state tracking queue 430. The snoop queue 450 maintains a record of whether the snoop phase for each transaction in the bus state tracking queue 430 has occurred. The internal control queue 455 tracks the state of each request in the bus state tracking queue 430 as the requests are being processed by the internal control logic 440.

The in-order queue 445, the snoop queue 450, and the internal control queue 455 are each first-in-first-out (FIFO) queues. Each time a transaction is removed from the top of the in-order queue 445, the corresponding snoop information is removed from the top of the snoop queue 450 and the corresponding control information is removed from the top of the internal control queue 455. Thus, the correspondence of elements in the queues 445, 450 and 455 is maintained.

In one embodiment of the present invention, each element in the bus state tracking queue contains 16 bits. These 16 bits are as shown in Table I below.

TABLE I

| Field | Number of Bits | Description |
|---|---|---|
| Transaction Responding Agent (TRA) | 1 | This bit is set to indicate that the request assigned to this element is targeted to this agent. |
| Timed Out Request (TOR) | 1 | This bit is supported by the compatibility bridge only. The TOR bit is activated if a transaction goes unclaimed on the bus for more than a predefined period of time. When this bit is activated, this resource is, by default, the responding agent. |
| Snoop Window Complete (Swc) | 1 | This bit is set when the snoop result phase for the request assigned to this element has completed. |
| Snoop Window Extension (Swe) | 1 | This bit is set when this agent needs to extend (stall) the snoop result phase. |
| Internal Operation Commit (Ioc) | 1 | This bit is set by the target block within the agent to indicate that the data operation is complete. The Ioc bit may be set at the access initiation or during a later event. |
| RequestOR (Ro) | 1 | This bit is set if this agent initiated the request assigned to this element. |
| Data Buffer Pointer (Db) | 1, 2 or 3 | These bits contain the pointer of the data buffer element (outbound or inbound) assigned to this request. The number of bits depends on the number of data buffer elements supported. One bit is used for 1 or 2 data buffer elements, 2 bits are used for 3 or 4 elements, and 3 bits are used for 5 to 8 elements. |
| Transfer Direction (Trndir) | 1 | This bit specifies the direction of the data transfer requested for this access. A 1 indicates a write and a 0 indicates a read. |

TABLE I-continued

| Field | Number of Bits | Description |
|---|---|---|
| System Management Interrupt (Smi) | 1 | This bit is used to signal a synchronous system management mode (SMM) interrupt during the response phase of a transaction. For those implementations which do not support SMM, this bit can be deleted. |
| Response Type (Rt) | 3 | These bits are used to determine the transaction response for a given request (see Table II below). |
| Data Length (Len) | 2 | This field is used to specify the length of the data transfer of the original request. |

By way of example, the bits of the bus state tracking queue can be used in responding to unclaimed bus transactions as follows. When a request is placed on the bus, the TOR and Swc bits of the bus state tracking queue 430 are set to 0. Additionally, if the request does not target the compatibility bridge, then the TRA bit is also set to 0. The Swc bit is set to 1 by the external control logic 420 when the snoop results are known. When the request propagates to the top of the bus state tracking queue 430, then the external control logic 420 checks whether the Swc bit is set to 1 and the TRA bit is set to 0. If not, then the external control logic 420 does not start the timer 425 until these conditions are met.

When the external control logic 420 determines that the Swc bit is set to 1 and the TRA bit is set to 0, the external control logic 420 starts the timer 425. If the transaction completes before the timer 425 expires, then the transaction is removed from the bus state tracking queue 430, and the timer 425 is cleared. However, if the timer 425 expires before the transaction completes, then the TRA and TOR bits are set to 1. The compatibility bridge then assumes responsibility for responding to the transaction and generates a response.

In one embodiment of the present invention, eight different response types are supported by the bus state tracking queue. These eight different responses are shown in Table II.

TABLE II

| Response Type | Rt[2:0] | Description |
|---|---|---|
| Configuration Address Cycle | [0 0 0] | This response type is not used for responding to unclaimed transactions. |
| Retry Response | [0 0 1] | This response type is not used for responding to unclaimed transactions. |
| Defer Response | [0 1 0] | This response type is not used for responding to unclaimed transactions. |
| Reserved | [0 1 1] | Reserved |
| Hard Failure Response | [1 0 0] | This response is used to respond to all unclaimed transactions when the system is configured to provide a hard failure response. |
| Normal Response without data | [1 0 1] | This response is sent when responding to an unclaimed write transaction. |
| Implicit Write Back Response | [1 1 0] | This response is sent when responding to an unclaimed transaction if a modified hit signal was asserted during the snoop phase for the transaction. |
| Normal Response with data | [1 1 1] | This response is sent when responding to an unclaimed read transaction. |

The response generated by the compatibility bridge depends on the initial request. Typically, the normal response without data and the normal response with data are the responses returned by the bridge when it claims transactions which did not target the bridge. The normal response without data is sent when the request is a write request. The normal response with data is sent when the request is a read request. The amount of data sent by the bridge depends on the original request. In one embodiment, the original request could be for 0, 1, 2 or 4 chunks of data. In one implementation, a chunk of data is 64 bits. The bridge can determine the amount of data to send by accessing the Len field of the bus state tracking queue 430.

In one embodiment of the present invention, the data sent by the bridge is a predetermined dummy value, such as all zeroes. In alternate embodiments, random values can be returned as the data. However, if random data is returned, care should be taken to ensure that the data returned is not the data the requesting agent is expecting (for example, the data previously written by the requesting agent as part of a polling operation).

In one embodiment of the present invention, the bus bridge is configured to provide a hard failure response when responding to an unclaimed transaction. In this embodiment, the hard failure response is returned by the bus bridge rather than the normal response. The bridge can be configured to provide a hard failure response in any of a wide variety of conventional manners. For example, the configuration option may be set using a jumper, a Flash memory device, or other suitable means.

The bus control logic 410 can be used to respond to unclaimed transactions, as discussed above, as well as unclaimed deferred transactions. By way of example, a request may be placed on the bus 435 and the targeted agent may issue a deferred response in the response phase. Upon receiving the deferred response, the external control logic 420 removes the request (including the original transaction identifier) from the bus state tracking queue 430 and places the request in the deferred transaction pending queue 460. When the request propagates to the top of the queue 460, the agent sets the timer 427. If a deferred response for the transaction is placed on the bus 435 (e.g., by the targeted agent) prior to expiration of the timer 427, then external control logic 420 removes the transaction from the queue 460 and resets the timer 427 (assuming there is another transaction in the queue 460 ). However, if the timer 427 expires, then the agent presumes that the originally targeted agent is not going to issue the deferred response and therefore the agent assumes responsibility for issuing the deferred response. The external control logic 420 generates a deferred reply transaction and arbitrates for ownership of the bus 435. Once the agent obtains ownership of the bus, the agent issues the deferred reply transaction on the bus 435 having a transaction identifier which matches the transaction identifier of the original request. The agent includes a response of either normal with data, normal without data, or hard fail, as discussed above.

Thus, the two timers 425 and 427 track unclaimed transactions in two separate queues. The timer 425 tracks unclaimed transactions in the bus state tracking queue 430, whereas the timer 427 tracks unclaimed transactions in the deferred transaction pending queue 460. In one embodiment, if one of the timers 425 or 427 expires, then the external control logic 420 responds to the unclaimed transaction at the top of the appropriate queue.

Figure 5:
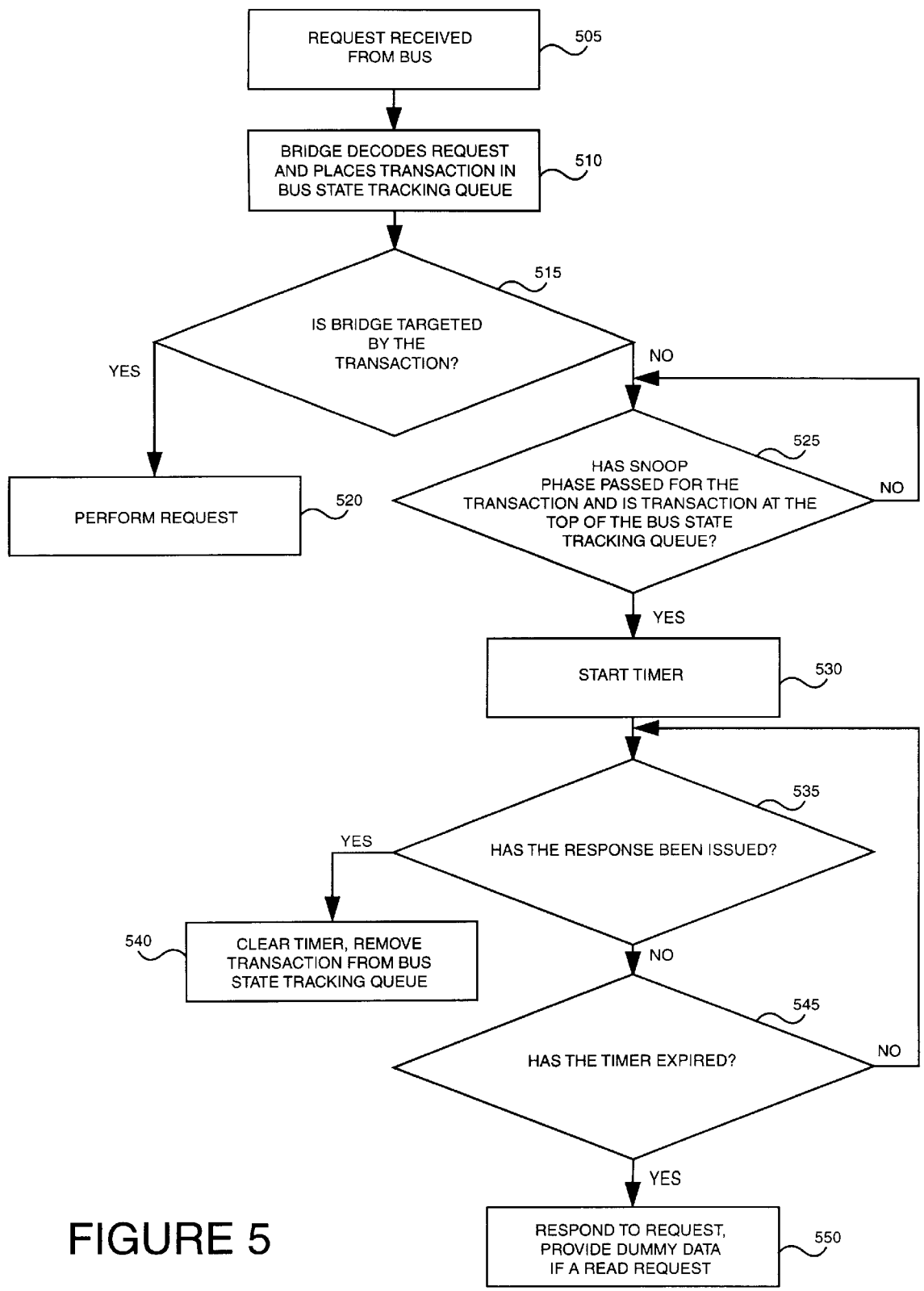
FIG. 5 is a flowchart showing the steps followed by one embodiment of the present invention in responding to unclaimed bus transactions.

FIG. 5 is a flowchart showing the steps followed by the present invention in responding to unclaimed bus transactions according to one embodiment of the present invention. The process begins when a request is received from the bus, step 505. The request is part of a bus transaction, as described above. The bridge decodes the request and places the request, along with other transaction information, in the bus state tracking queue, step 510. In one embodiment of the present invention, each agent coupled to the bus, including the bridge containing the logic of the present invention, retrieves all requests from the bus. Thus, the bus state tracking queues for each agent coupled to the bus should contain the same entries. However, as described above, only one agent coupled to the bus responds to unclaimed bus transactions.

Once the request is decoded, the bridge checks whether it is targeted by the transaction, step 515. In one embodiment of the present invention, each agent coupled to the bus occupies a unique address location. These unique addresses are used by other agents to send requests to a particular agent. If the bridge is targeted by the transaction, then the bridge performs the request, step 520. For example, a read or write transaction is transferred to the appropriate agent on the second bus coupled to the bridge for handling by that agent. It should be noted that the bridge could be targeted by using a unique address location for the bridge, or by using a unique address location for an agent on the second bus coupled to the bridge.

However, if the bridge is not the target of the transaction then the bridge waits for the transaction to propagate to the top of the bus state tracking queue, where it checks whether the snoop phase has passed for the transaction, step 525. In one embodiment of the present invention, snoop control logic is coupled to the bus state tracking queue. In one implementation, the snoop control logic sets the Swc bit for the transaction in the bus state tracking queue when the snoop results have been sampled for the transaction. Thus, in this implementation, the control logic can determine whether the snoop phase has passed for the transaction by checking the Swc bit.

If the snoop phase for the transaction has not passed or the transaction is not at the top of the bus state tracking queue, then the present invention does not proceed with treating the transaction as an unclaimed transaction until both of these conditions are satisfied. The present invention continuously checks whether the snoop phase has passed and whether the transaction is at the top of the queue, and proceeds once both of these conditions are satisfied.

When the snoop phase has passed, the bridge starts a timer, step 530. In one embodiment, this timer is the timer 425 of FIG. 4. The bridge then checks whether the response phase for the transaction has occurred, step 535. That is, the present invention checks whether a response has been given for this request. If the response phase has passed (and the data transfer phase, if necessary), then the bridge clears the timer and removes the request from the bus state tracking queue, step 540.

However, if the response phase has not passed then the bridge checks whether the timer set in step 530 has expired, step 545. If the timer has not expired, then the bridge continues to check whether the response phase has passed or the counter has expired, repeating steps 535 and 545.

If the timer has expired, then the bridge assumes the transaction is unclaimed (that is, the targeted agent is not going to respond to the request) and responds to the request, step 550. The bridge changes any necessary internal controls to indicate that the bridge assumes response control. If the request was a read request, then the bridge provides data with the response. If the request was a write request, then the bridge asserts a signal to the requesting agent to place the write data on the bus, assuming the data has not already been transferred (e.g., if the targeted agent asserted a signal for the agent to place the write data on the bus but did not respond in the response phase). This write data, however, is ignored by the bridge, and thus is lost.

In alternate embodiments of the present invention, the bridge does not wait for the transaction to propagate to the top of the bus state tracking queue or for the snoop phase to pass before starting the timer. In these alternate embodiments, the timer can be set at different times, such as during the request phase, during the snoop phase, when the transaction propagates to the top of the bus state tracking queue (regardless of whether the snoop phase has passed), or at any other time while the transaction is pending in the bus pipeline. In these alternate embodiments, however, care should be taken to allow the targeted agent enough time to respond to the request before the present invention responds to the request as an unclaimed transaction.

Figure 6:
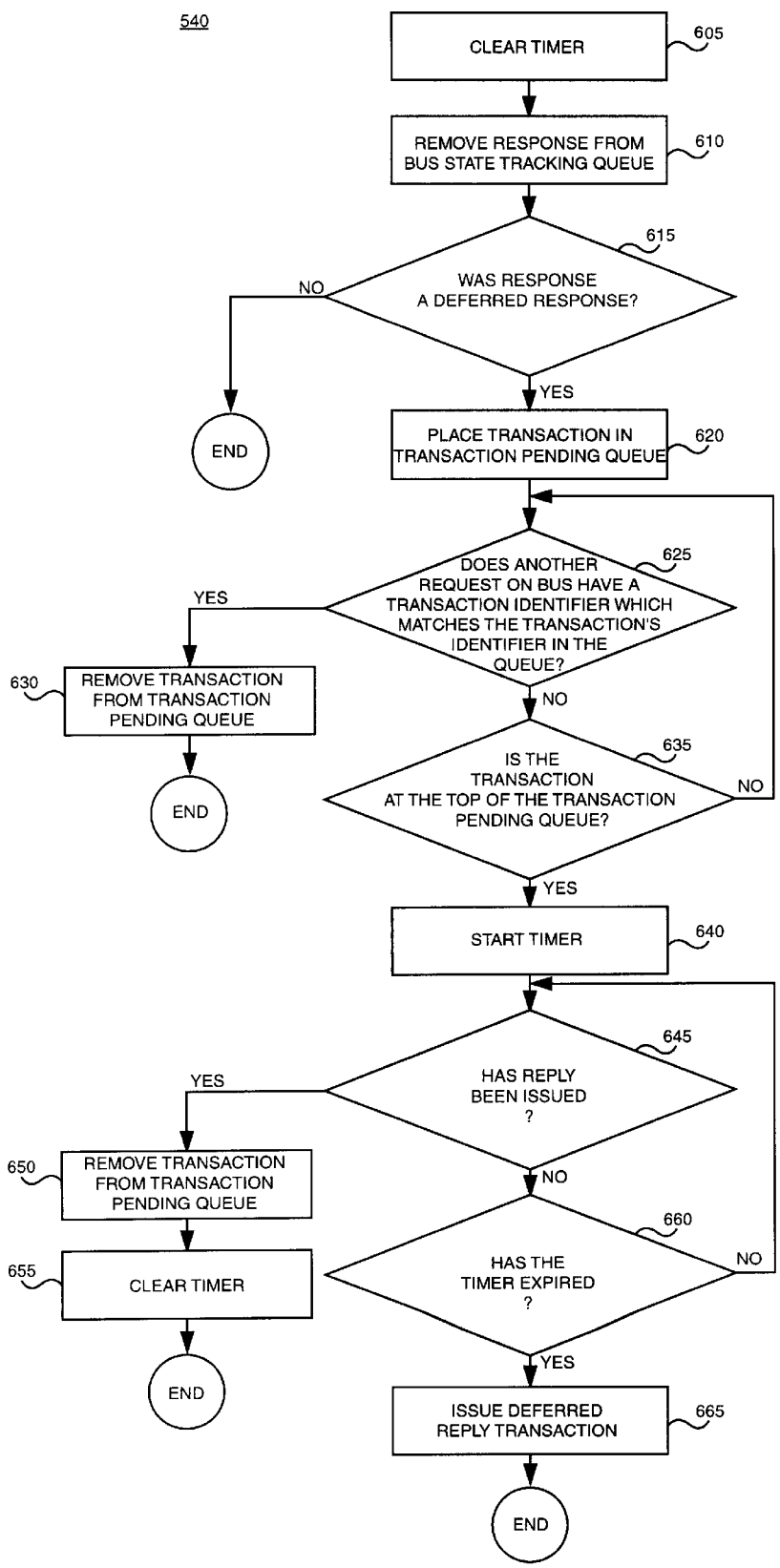
FIG. 6 is a block diagram showing the steps followed by one embodiment of the present invention in responding to an unclaimed deferred transaction.

FIG. 6 is a block diagram showing the steps followed by the present invention in responding to an unclaimed deferred transaction according to one embodiment of the present invention. In one embodiment, FIG. 6 shows step 540 of FIG. 5 in more detail.

The process begins with the bridge clearing the timer corresponding to the bus state tracking queue, step 605. In one embodiment, this is the timer 425 of FIG. 4. The bridge then removes the transaction from the bus state tracking queue, step 610. The bridge then checks whether the response was a deferred response, step 615. If the response was not a deferred response, then the transaction is complete and no further tracking of the transaction is done by the bridge.

However, if the response was a deferred response, then the bridge places the transaction in the transaction pending queue, step 620. If a subsequent transaction placed on the bus includes a transaction identifier which matches the identifier of this transaction, step 625, then the transaction is removed from the transaction pending queue, step 630. The bridge continually checks whether a request placed on the bus has a transaction identifier which matches the identifier of this request until the transaction propagates to the top of the transaction pending queue, step 635.

Once the transaction is at the top of the transaction pending queue, then the bridge starts the timer corresponding to the transaction pending queue. In one embodiment, this is the timer 427 of FIG. 4. The bridge then checks whether a deferred reply transaction corresponding to this transaction has been issued on the bus (based on the transaction identifiers), step 645. If a deferred reply corresponding to this transaction has been placed on the bus, then the transaction is removed from the transaction pending queue, step 650, and the timer corresponding to the deferred transaction pending queue is cleared, step 655. However, if a deferred reply corresponding to this transaction has not been issued on the bus, then the bridge checks whether the timer has expired, step 660. If not, then the bridge continues to check transactions on the bus until the timer expires, steps 645 and 660.

If the timer expires, then the bridge assumes responsibility for issuing the deferred reply transaction. The bridge then issues a deferred reply transaction to the request, step 665. The deferred reply transaction includes a transaction identifier which matches the identifier of this transaction in the queue. The bridge returns a normal with data, normal without data, or hard fail, depending on the original request and the configuration of the bridge, as discussed above.

It should be noted that in certain situations the bridge itself may place a request on the bus which is unclaimed, resulting in the bridge responding to itself. For example, returning to FIG. 1, the mass storage device 136 may initiate a request which targets a nonexistent agent on the processor-memory bus 101. This request is received by the bridge 124, which initiates a transaction on the processor-memory bus 101 for the request. However, the bridge 124 will eventually claim responsibility for responding to the request because the target agent is nonexistent.

In the descriptions above, the timers 425 and 427 of FIG. 4 are discussed as performing a temporal count. It is to be appreciated, however, that each of the timers 425 and 427 can be a counter which counts any of a wide variety of events and is not limited to counting only time.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

Thus, a method and apparatus for responding to unclaimed bus transactions has been described.

What is claimed is:

1. A computer system comprising:

a bus;

a first agent coupled to the bus;

a second agent coupled to the bus for issuing to the first agent a first request for a response, the first request including a first identifier; and a third agent coupled to the bus for issuing to the second agent an appropriate response wherein the appropriate response is selected from the group comprising normal response with data, normal response without data, hard failure response, and implicit write back response if the second agent does not respond, the third agent including, a comparator for comparing identifiers of responses against the first identifier to determine whether any of the responses is responsive to the request;

means for tracking and identifying outstanding requests on the bus;

means, responsive to the means for tracking and identifying, for determining a total number of outstanding requests; and means, responsive to the means for determining, for issuing a response to the request onto the bus when a predetermined number of outstanding requests has been identified.

2. The system of claim 1, wherein the status of the first request includes the first request targeting the third agent; and a snoop phase having occurred for the first request.

3. The system of claim 1, wherein the third agent further comprises a queue to maintain a record of the first request; and a timer, responsive to the status of the first request, to determine the amount of time that the request has been in the queue.

4. The system of claim 1, wherein the first request is a read request and the response includes predefined data.

5. The system of claim 3, wherein the status of the first request further includes the first request being at the top of the queue.

6. The system of claim 4 wherein the third agent responds to the first request if the second agent does not respond within a predetermined period of time.

7. An apparatus comprising:

a bus;

first agent means coupled to the bus;

second agent means coupled to the bus for issuing to the first agent means a first request for a response, the first request including a first identifier;

a third agent means coupled to the bus for issuing to the second agent an appropriate response according to a status of the first request if the second agent does not respond, the third agent means including comparator means for comparing identifiers of responses against the first identifier to determine whether any of the responses is responsive to the request;

tracker means for tracking and identifying outstanding requests on the bus;

determining means for determining a total number of outstanding requests; and output means for issuing a response to the request onto the bus when a number of outstanding requests have been identified.

8. The apparatus of claim 7, wherein the status of the first request includes the first request targeting the third agent; and a snoop phase having occurred for the first request.

9. The apparatus of claim 7, wherein the third agent means further comprises queue means for maintaining a record of the first request; and timer means, responsive to the status of the first request, for determining the amount of time that the request has been in the queue.

10. The apparatus of claim 7, wherein the first request is a read request and the response includes predefined data.

11. The apparatus of claim 9, wherein the status of the first request further includes the first request being at the top of the queue.

12. The apparatus of claim 11 wherein the third agent responds to the first request if the second agent does not respond within a predetermined period of time.

* * * * *